(12) United States Patent
Moore (10) Patent No.: US 8,448,752 B2
(45) Date of Patent: May 28, 2013

(54) HYDRAULIC BRAKE DEVICE

(75) Inventor: Wayne-Ian Moore, Changhua (TW)

(73) Assignee: Ashima Ltd., Changhua (TW)

( * ) Notice: Subject to any disclaimer, the term of this patent is extended or adjusted under 35 U.S.C. 154(b) by 216 days.

(21) Appl. No.: 12/642,861

(22) Filed: Dec. 21, 2009

(65) Prior Publication Data

US 2011/0147137 A1    Jun. 23, 2011

(51) Int. Cl.
*B62L 1/02* (2006.01)

(52) U.S. Cl.
USPC ............. 188/24.12; 188/24.22; 188/344; 280/274; 280/281.1

(58) Field of Classification Search
USPC ...... 188/24.12, 24.22, 24.11, 344; 280/281.1, 280/274
See application file for complete search history.

(56) References Cited

U.S. PATENT DOCUMENTS

| | | | | |
|---|---|---|---|---|
| 3,921,764 A * | 11/1975 | Mathauser | ............... | 188/24.14 |
| 4,005,874 A * | 2/1977 | Ohtani | ............... | 280/288.4 |
| 4,391,353 A * | 7/1983 | Mathauser | ............... | 188/24.12 |
| 4,441,592 A * | 4/1984 | Everett | ............... | 188/264 A |
| 4,558,765 A * | 12/1985 | Hogan | ............... | 188/24.19 |
| 4,585,094 A * | 4/1986 | Rottenkolber et al. | ..... | 188/24.22 |
| 4,896,753 A * | 1/1990 | Sule | ............... | 188/344 |
| 5,259,483 A * | 11/1993 | Pelfrey | ............... | 188/71.1 |
| 5,499,699 A * | 3/1996 | Chen | ............... | 188/24.21 |
| 5,531,296 A * | 7/1996 | Liu | ............... | 188/24.21 |
| 5,562,297 A * | 10/1996 | Lin | ............... | 280/276 |
| 5,615,753 A * | 4/1997 | Wang | ............... | 188/24.12 |
| 5,690,192 A * | 11/1997 | Kuo | ............... | 188/24.22 |
| 5,743,284 A * | 4/1998 | Lumpkin | ............... | 188/24.22 |
| 5,813,501 A * | 9/1998 | Terry, Sr. | ............... | 188/344 |
| 5,924,525 A * | 7/1999 | Sugimoto | ............... | 188/24.21 |
| 5,979,608 A * | 11/1999 | Muraoka | ............... | 188/24.14 |
| 6,220,399 B1 * | 4/2001 | Phillips et al. | ............... | 188/24.21 |
| 6,374,957 B1 * | 4/2002 | Krumbeck et al. | ........ | 188/24.19 |
| 7,464,798 B2 * | 12/2008 | Sandro et al. | ............... | 188/24.22 |
| 7,537,232 B2 * | 5/2009 | Yu | ............... | 280/281.1 |
| 2011/0240419 A1 * | 10/2011 | Moore | ............... | 188/73.42 |

* cited by examiner

*Primary Examiner* — Robert A Siconolfi
*Assistant Examiner* — Mariano Sy (57) ABSTRACT

A hydraulic brake device includes a carrier body. The carrier body is integrally molded. The carrier body has at least one assembling portion disposed thereon for assembling purpose. The carrier body has at least one connecting portion respectively extending from the at least one assembling portion. At least one hydraulic brake assembly movably is mounted on the at least one connecting portion of the carrier body. The carrier body with the at least one brake assembly are adapted to assemble with a bicycle for providing a stable assembling effect, a high structural strength, and lightweight effect.

8 Claims, 7 Drawing Sheets

HYDRAULIC BRAKE DEVICE

BACKGROUND OF THE INVENTION

1. Field of the Invention

The present invention relates to a hydraulic brake, and more particularly to a hydraulic brake assembly used to apply opposing brake loads on the wheel rim of a vehicle such as a bicycle, a motorcycle, and the like.

2. Description of Related Art

A conventional rim brake in accordance with the prior art comprises a pair of left and right arms pivotally attached to a frame of a bicycle, each having on its distal end portion a brake shoe, and a spring for energizing the arms to move toward brake releasing direction. When braking, each arm pivotally moves toward a rim such that each brake shoe forces against the rim to brake. The movement of each arm is angular such that an upper/lower edge of each brake shoe abuts against the rim first. This pivotal type of load application results in inefficient braking force due to play in the pivots and the none-parallel contact between the brake shoe and rim results in uneven wear Furthermore, in the case of a road bike, the left and right arms rotate about a central pivot this arrangement makes them very prone to twist under the resulting braking torque making the braking performance inefficient, especially in the case of ultra-light brakes which have become the market trend. Moreover, the arms need to rotate to achieve the braking load and because the conventional rim brake needs to be mounted to the head tube of the bicycle frame and a heavy duty return spring must be accommodated for releasing the arms, these become the limiting factors when trying to design ultra-light rim brake. In addition, the conventional rim brake employed on mountain bikes are composed of the left and right arms, the two-piece structure of the conventional rim brake relies on brake load being transferred from one side rim to the other by reaction forces, if not carefully set-up this may not provide a stable supporting force such that the brake force is unbalance.

A conventional hydraulic brake in accordance with the prior art comprises a hydraulic cylinder, a piston movably received in the axial direction of the cylinder, and a brake pad connected to the piston. When braking, the piston moves toward a disk such that the brake pad forces against the disk to brake. The conventional hydraulic brake improves the structure for providing a stable brake force to the disc. However, the conventional hydraulic brake is cooperated with the disc and the brake load is applied to one side of the wheel which can result in twisting effect of the front wheel. The use of a disk limits the manufacture and assembling of the conventional hydraulic brake to the bike. In addition, the cost of the conventional hydraulic disk brake is high such that the tolerance of the cylinder bore and the piston diameter are critical. The weight of the conventional hydraulic disk brake is heavy. Moreover, most road bicycle frames are designed for the traditional caliper road brakes and no mountings are present for more powerful hydraulic brakes. Additionally some MTB bicycles are designed to fit only conventional V-brakes or standard disk brakes.

The present invention has arisen to mitigate and/or obviate the disadvantages of the conventional rim brake and disk brake.

SUMMARY OF THE INVENTION

The main objective of the present invention is to provide an improved hydraulic brake device of a vehicle such as a bicycle, a motorcycle, and the like.

To achieve the objective, the hydraulic brake device comprises a carrier body and two hydraulic brake assemblies respectively movably connected to the carrier body. In the case of a road bike, the carrier body is integrally molded and is in a reversed U-shape. The carrier body has an assembling portion disposed on a top thereof and two connecting portion extending from two sides of the assembling portion. The carrier body has a hollow structure. The carrier body having multiple ribs disposed in the hollow structure thereof for enhancing structural strength. A mounting bolt passes through the assembling portion of the carrier and screwed into a bicycle such that the carrier is mounted on the bicycle. Each hydraulic brake assembly includes a housing and an elastomer connected to the housing. The elastomer has a U-shaped portion formed therein and a movable portion disposed in a center thereof and connected to the U-shaped portion. A holder is connected to the elastomer and has a dovetail groove defined therein for detachably receiving a brake shoe. A seal plate is mounted in the housing and has a shoulder extending from the seal plate. The elastomer has a flange extending therefrom.

In accordance with another aspect of the present invention, two carrier bodies respectively mounted on two sides of the bicycle fork. Each of the two carrier bodies has an integrally molded hollow structure. The two carrier bodies are symmetrical with respect to one another. The two carrier bodies are respectively connected to two hydraulic brake assemblies. The carrier body has an assembling portion provided for fixing on the bicycle fork and a connecting portion extending from the assembling portion for connecting to the hydraulic brake assembly. The two integrally molded carrier bodies are cooperated with the two hydraulic brake assemblies and respectively mounted on two sides of the bicycle fork for providing a stable assembling effect, a high structural strength, and lightweight effect. The carrier bodies are separately mounted or replaced for providing easily maintaining effect.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a hydraulic brake device in accordance with the present invention comprises a carrier body 10 and two hydraulic brake assemblies 20, 20a respectively movably connected to the carrier body 10, in the preferred embodiment, the two hydraulic brake assemblies 20,20a are symmetrical with respect to one another such that a balanced braking force is obtained. In the following, only one of the two hydraulic brake assemblies 20,20a is described.

The carrier body 10 is integrally molded. In the preferred embodiment for a road bike, the carrier body 10 is in a reversed U-shape for providing a rigid structure. The carrier body 10 has an assembling portion 101 disposed on a top thereof for assembling purpose. The carrier body 10 has two connecting portion 102 curvedly extending from two sides of the assembling portion 101. The carrier body 10 has a hollow structure. The carrier body 10 having multiple ribs 103 disposed in the hollow structure thereof for enhancing structural strength. An assembling hole (not numbered) is defined in the assembling portion 101 of the carrier body 10 for receiving a mounting bolt 11. The mounting bolt 11 is provided for connecting to a frame of the bicycle such that the hydraulic brake device in accordance with the present invention can be mounted on the bicycle or the similar vehicle. The hydraulic brake assembly 20 is partially received in one end of the carrier body 10. The carrier body 10 has two elongated holes 12 respectively defined in one end thereof for adjusting the position of the hydraulic brake assembly 20 relative to the end of the carrier body 10. A positioning bolt 13 passes the hydraulic brake assembly 20 via the elongate hole 12 to fasten the hydraulic brake assembly 20 and the carrier body 10. The integrally molded carrier body 10 with the two hydraulic brake assemblies 20, 20a are mounted on the bicycle for providing a stable assembling effect, a high structural strength, and lightweight effect.

Figure 1:
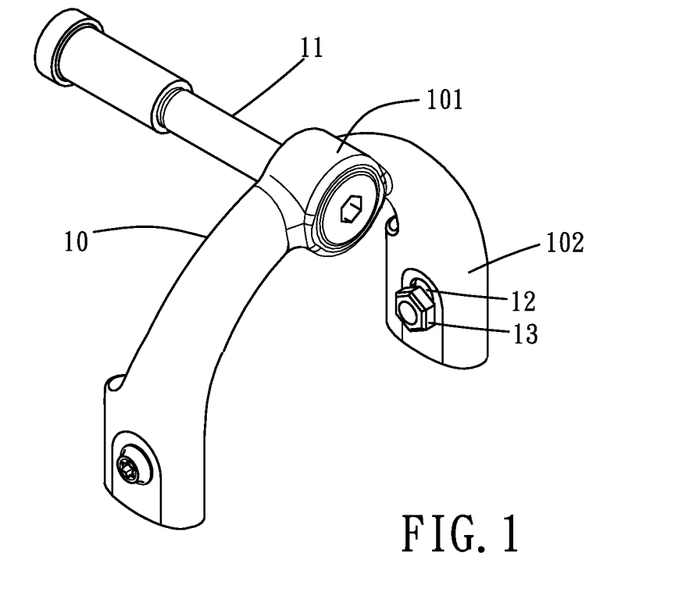
FIG. 1 is a perspective view of a carrier body of a hydraulic brake device in accordance with the present invention.
Figure 2:
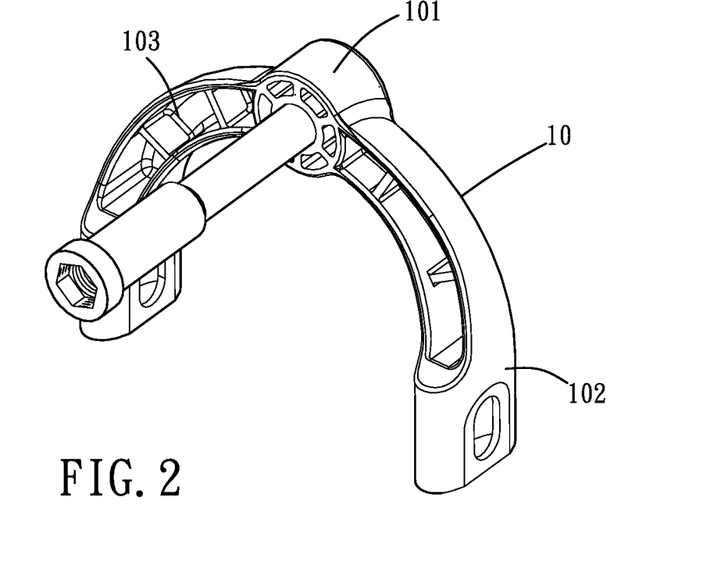
FIG. 2 is a perspective view of the carrier body in another direction.
Figure 3:
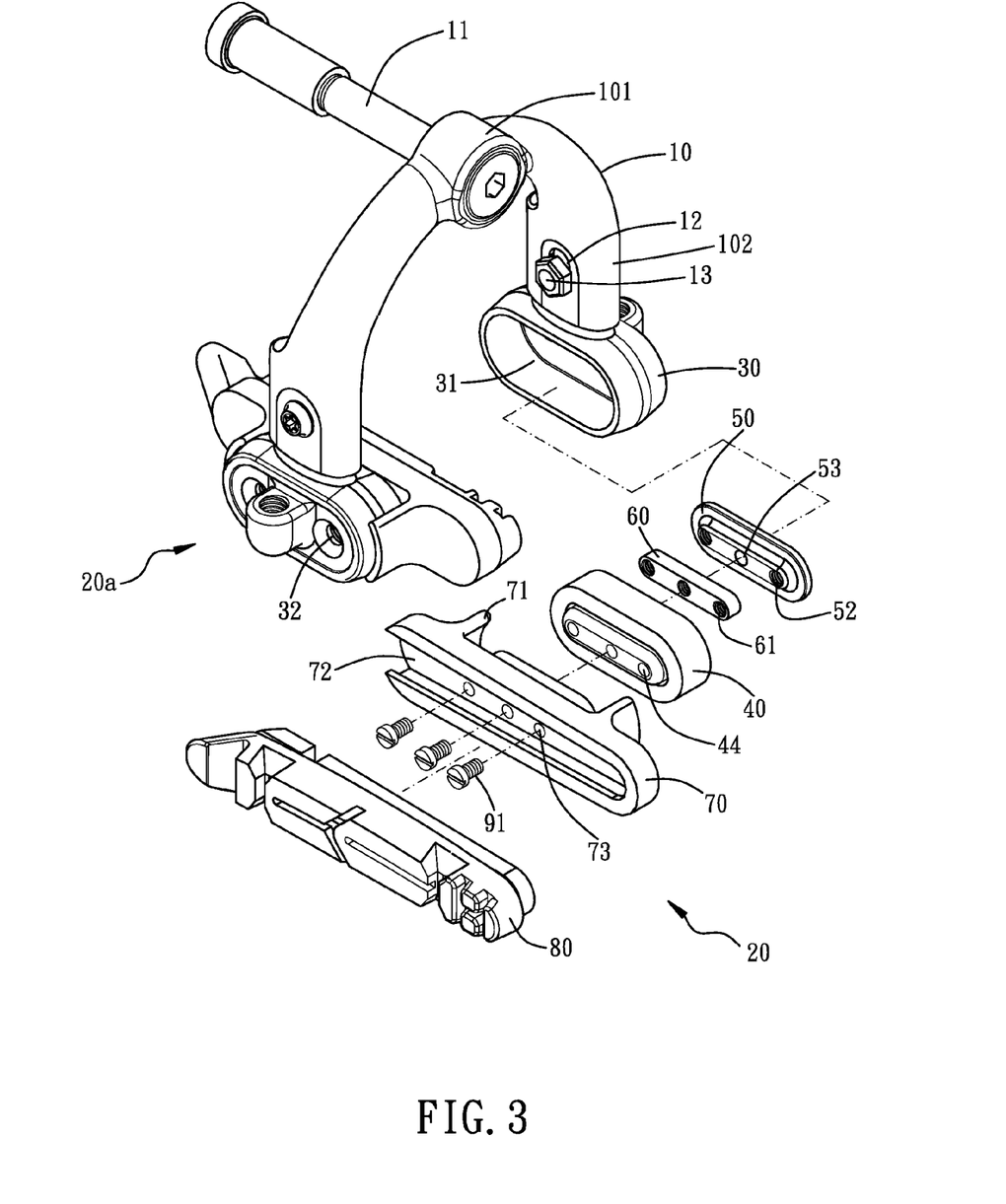
FIG. 3 is a partial exploded perspective view of the hydraulic brake device in accordance with the present invention.
Figure 4:
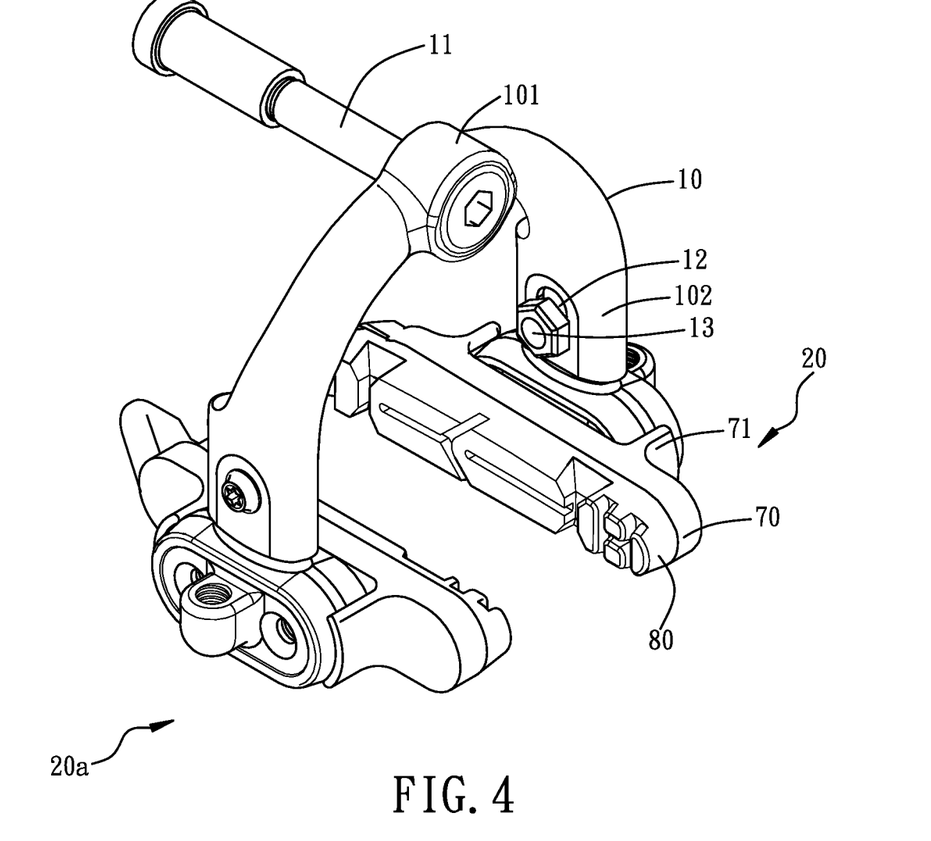
FIG. 4 is an assembled perspective view of the hydraulic brake device in accordance with the present invention.

The hydraulic brake assembly 20 includes a housing 30 and an elastomer 40 connected to the housing 30. The housing 30 has an ovular and open chamber 31 defined therein for receiving the brake oil. The elastomer 40 has an ovular shape corresponding to the chamber 31 and is sealingly received in the chamber 31. The elastomer 40 has a flange 41 extended therefrom. The hydraulic brake assembly 20 further includes a sealing plate 50 received in the chamber 31. The sealing plate 50 has a shoulder 51 extended therefrom. The housing 30 has two through holes 32 defined therein. The sealing plate 50 has two screw holes 52 defined therein and corresponding to the two through holes 32. When assembling, two screws 91 pass through the two through holes 32 and fasten with the two screw holes 52 such that the shoulder 51 abuts against the flange 41 to provide a sealing effort. The sealing plate 50 has a bore 53 defined therein for passing the brake oil from oil tube (not shown).

The elastomer 40 has a U-shaped portion 42 formed therein for providing a resilient force. The elastomer 40 has a movable portion 43 disposed in a center thereof and connected to the U-shaped portion 42. When the oil pressure is high, the U-shaped portion 42 deforms such that the movable portion 43 is pushed outwardly. When the oil pressure is low, the U-shaped portion 42 restores such that the movable portion 43 moves back. The elastomer 40 has at least one bore 44 defined in the movable portion 43. The hydraulic brake assembly 20 further includes an insert 60 received in the chamber 31. The insert 60 is corresponding to the movable portion 43. The insert 60 has at least one threaded hole 61 defined therein and corresponding to the at least one bore 44.

The hydraulic brake assembly 20 further includes a holder 70 connected to the elastomer 40, a brake shoe 80 connected to the holder 70, and at least one screw 91 connected to the holder 70. The holder 70 has two aprons 71 extended therefrom for restrictedly abutting against the housing 30. The holder 70 has a dovetail groove 72 defined therein for detachably receiving the brake shoe 80. The holder 70 has at least one through hole 73 defined in a bottom of the dovetail groove 72 and corresponding to the at least one bore 44 in the elastomer 40. When assembling, the at least one screw 91 passes the at least one through hole 73 in the holder 70 and the at least one bore 44 in the elastomer 40 and fastens with the at least one threaded hole 61 in the insert 60. The brake shoe 80 is a conventional brake shoe 80 and is replaceable.

Figure 5:
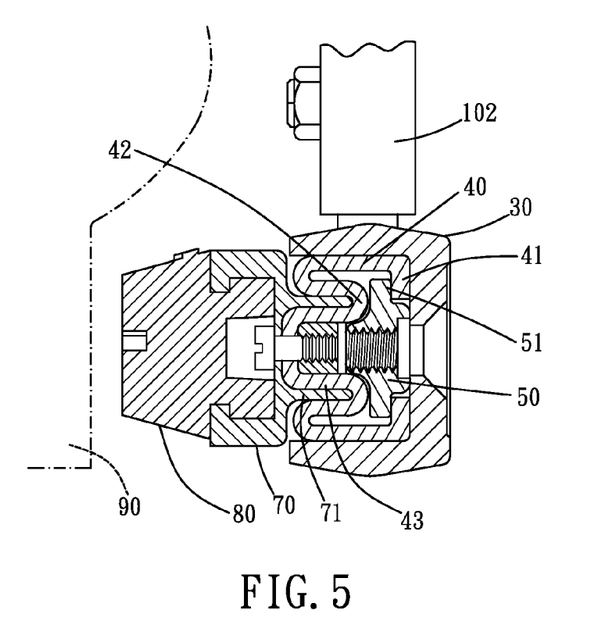
FIG. 5 is a partial cross-sectional front plane view of the hydraulic brake device in accordance with the present invention.
Figure 6:
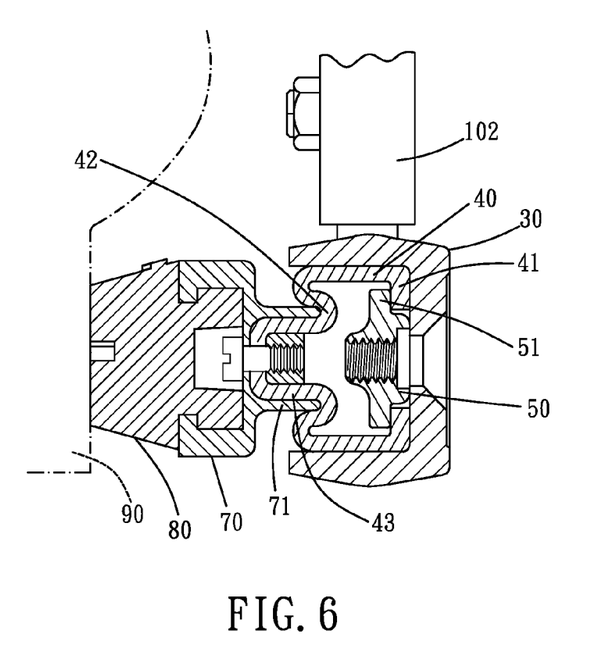
FIG. 6 is a partial cross-sectional front plane view of the hydraulic brake device in accordance with the present invention, showing that the brake shoe forces against the rim.

Referring to FIGS. 5 and 6, the operation of the hydraulic brake assembly 20 for the hydraulic brake device is illustrated. FIG. 5 shows the hydraulic brake assembly 20 is in an initial condition. The movable portion 43 of the elastomer 40 is connected to the holder 70. When braking, the oil pressure in the chamber 31 is raised. The U-shaped portion 42 deforms gradually and the movable portion 43 is pushed outwardly such that the holder 70 and the brake shoe 80 are pushed toward a rim 90 until the brake shoe 80 forces against the rim 90 to brake. When the oil pressure is diminished, the movable portion 43 is pulled back by the resilient fore of the U-shaped portion 42. The two aprons 72 abut against an outer peripheral of the housing 30 for providing the stable effort. The ovular elastomer 40 permits a large surface area in significantly lower profile than a conventional disk brake of equivalent piston area. The holder 70 with the brake shoe 80 moves in a straight line to provide a surface contact between the brake shoe 80 and the rim 90 such that the hydraulic brake assembly 20 is effective to brake.

Figure 7:
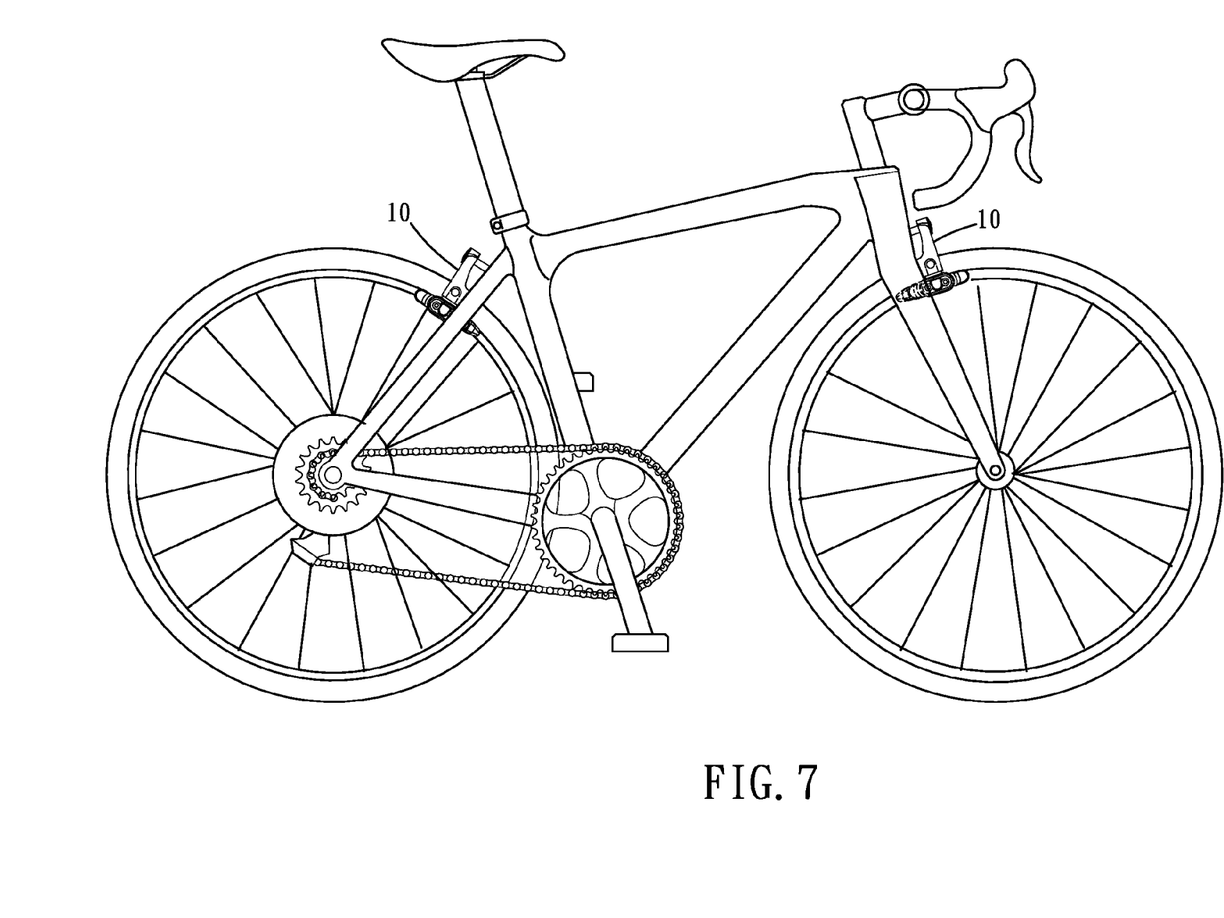
FIG. 7 shows the hydraulic brake device in accordance with the present invention are respectively mounted in a front fork and a rear fork of a bicycle.

Referring to FIG. 7, the hydraulic brake device in accordance with the present invention is respectively mounted in a front fork and a rear fork of a bicycle.

Figure 8:
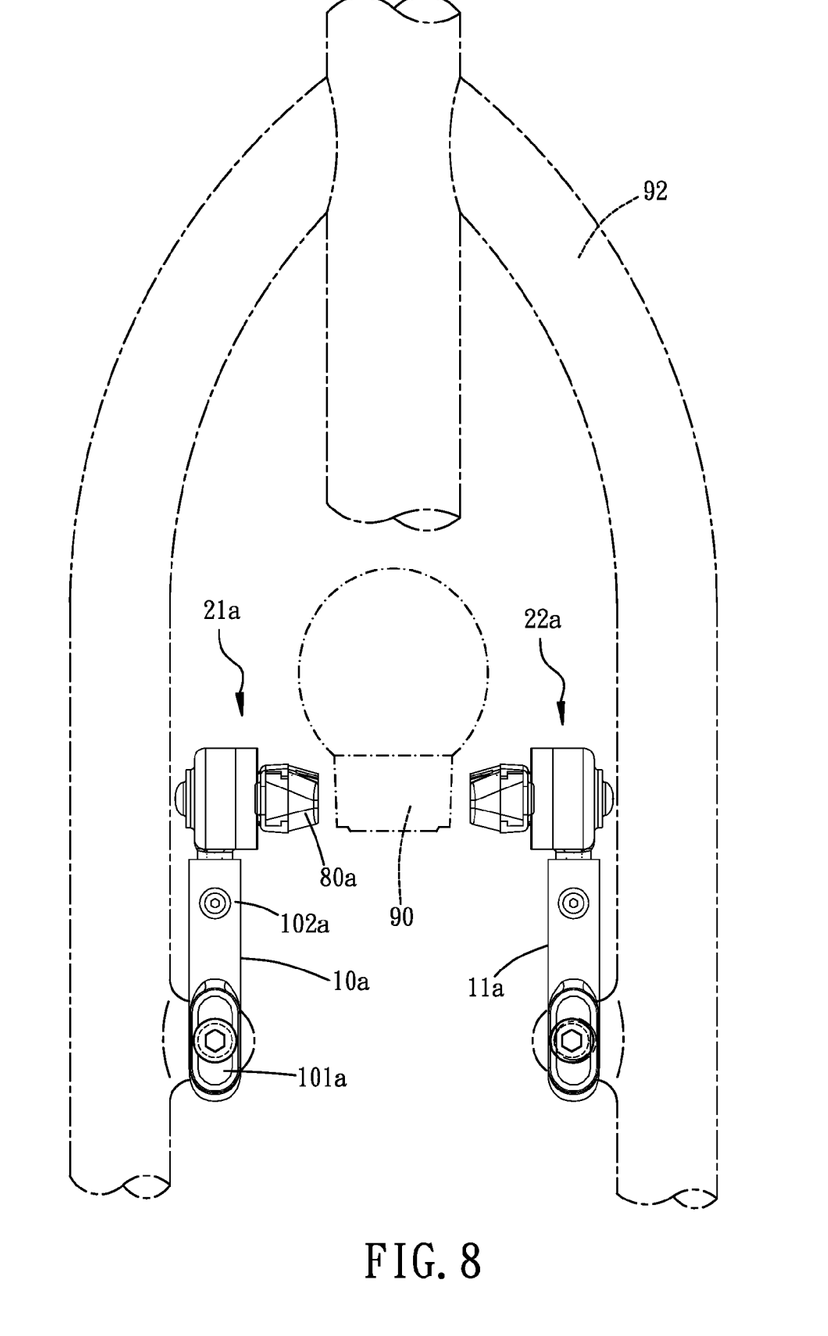
FIG. 8 shows an operational view of the hydraulic brake device of a second embodiment in accordance with the present invention.

With reference to FIG. 8, that shows a second embodiment of the rim brake in accordance with the present invention. The elements and effects of the second embodiment which are the same with the first embodiment are not described, only the differences are described. In the second embodiment, two carrier bodies 10a, 11a respectively mounted on two sides of the bicycle fork 92. Each of the two carrier bodies 10a, 11a has an integrally molded hollow structure. The two carrier bodies 10a, 11a are symmetrical with respect to one another. The two carrier bodies 10a, 11a are respectively connected to two hydraulic brake assemblies 21a, 22a. In the following, only one of the carrier bodies 10a and the corresponding hydraulic brake assembly 21a are described. The carrier body 10a has a assembling portion 101a provided for fixing on the bicycle fork 92 and a connecting portion 102a extending from the assembling portion 101a for connecting to the hydraulic brake assembly 21a. The brake shoe 80a of each of the two hydraulic brake assemblies 21a, 22a is abutted against the rim 90 for providing rim brake effect. The two integrally molded carrier bodies 10a, 11a are cooperated with the two hydraulic brake assemblies 21a, 22a and respectively mounted on two sides of the bicycle fork 92 for providing a stable assembling effect, a high structural strength, and lightweight effect. The carrier bodies 10a, 11a are separately mounted or replaced for providing easily maintaining effect.

Figure 9:
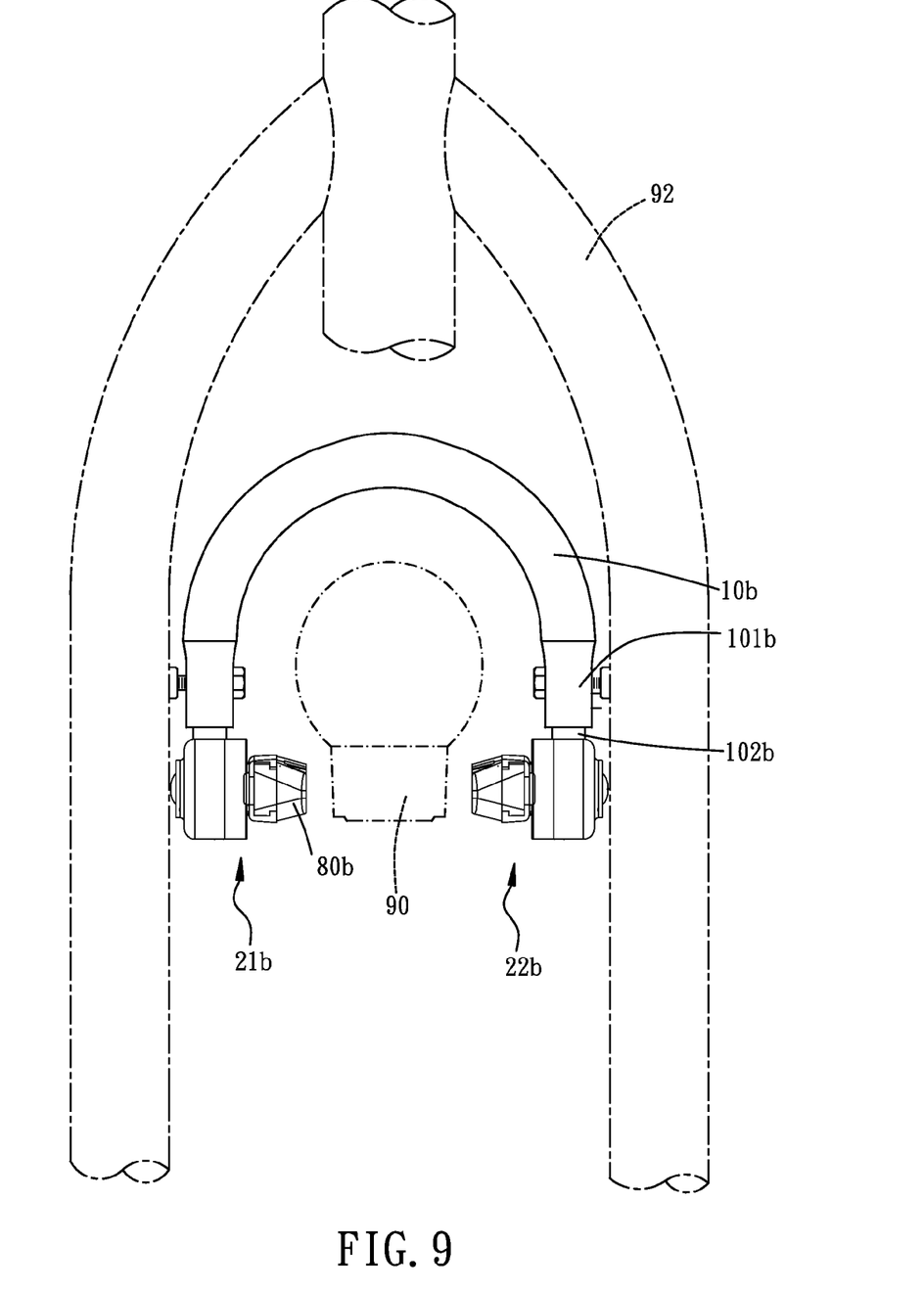
FIG. 9 shows an operational view of the hydraulic brake device of a third embodiment in accordance with the present invention.

With reference to FIG. 9, that shows a third embodiment of the rim brake in accordance with the present invention. The elements and effects of the third embodiment which are the same with the first embodiment are not described, only the differences are described. In the third embodiment, the integrally molded carrier body 10b is in reversed U shape. Each of two sides of the carrier body 10b has an assembling portion 101b and a connecting portion 102b extending from the assembling portion 101b. Two hydraulic brake assemblies 21b, 22b are respectively mounted on the two connecting portions 102b of the carrier body 10b and the brake shoe 80b of each of the two hydraulic brake assemblies 21b, 22b is abutted against the rim 90 for providing rim brake effect. The two assembling portions 101b of the carrier body 10b are mounted on two sides of the bicycle fork 10b such that two sides of the carrier body 10b are respectively mounted on two sides of the bicycle fork 92 for providing a stable assembling effect, a high structural strength, and lightweight effect.

Although the invention has been explained in relation to its preferred embodiment, it is to be understood that many other possible modifications and variations can be made without departing from the spirit and scope of the invention as hereinafter claimed.

What is claimed is:

1. A hydraulic brake device comprising:
a carrier body, the carrier body being integrally molded, the carrier body having at least one assembling portion disposed thereon for assembling purpose, the carrier body having at least one connecting portion respectively extending from the at least one assembling portion;
at least one hydraulic brake assembly movably mounted on the at least one connecting portion of the carrier body;
each of the at least one hydraulic brake assembly having a housing and an elastomer;
the housing having a chamber defined therein for receiving brake oil, the elastomer sealingly received in the chamber, the elastomer having a U-shaped portion formed therein and a movable portion disposed in a center thereof and connected to the U-shaped portion;
a holder connected to the elastomer, the holder having a dovetail groove defined therein for detachably receiving a brake shoe; and
a sealing plate received in the chamber, the sealing plate having a shoulder extended therefrom, the elastomer having a flange extended therefrom, wherein the shoulder abuts against the flange to provide a sealing effort;
wherein the carrier body with the at least one brake assembly are adapted to assemble with a bicycle for providing a stable assembling effect, a high structural strength, and lightweight effect; when oil pressure is raised, the U-shaped portion deforms and the movable portion is pushed outwardly such that the holder is pushed outwardly.

2. The hydraulic brake device as claimed in claim 1, wherein the carrier body having a mounting bolt passing through the at least one assembling portion of the carrier body; wherein the mounting bolt is provided for adapting to screw into the bicycle such that the carrier body is mounted on the bicycle.

3. The hydraulic brake device as claimed in claim 1, wherein the carrier body has at least one elongated hole defined in the connecting portion thereof for adjusting the position of the at least one hydraulic brake assembly relative to the carrier body.

4. The hydraulic brake device as claimed in claim 1, wherein the at least one connecting portion is extending from two sides of the assembling portion such that the carrier body is in a reversed U-shape.

5. The hydraulic brake device as claimed in claim 1, wherein the at least one connecting portion includes two connecting portion respectively disposed on two sides of the carrier body, the two connecting portion curvedly extended such that the carrier body is in a reversed U-shape, the at least one assembling portion including two assembling portions respectively extending from the two connecting portion, the two connecting portion provided for adapting to connect a bicycle fork.

6. The hydraulic brake device as claimed in claim 1, wherein the chamber has an ovular shape, the elastomer having an ovular shape corresponding to the chamber.

7. The hydraulic brake device as claimed in claim 1, wherein the housing has two through holes defined therein, the sealing plate having two screw holes defined therein and corresponding to the two through holes, wherein two screws pass through the two through holes and fasten with the two screw holes.

8. The hydraulic brake device as claimed in claim 1, wherein the carrier body has a hollow structure, the carrier body having multiple ribs disposed in the hollow structure thereof for enhancing structural strength.

\* \* \* \* \*